(12) United States Patent
Basavarajappa et al.

(10) Patent No.: US 9,944,172 B2
(45) Date of Patent: Apr. 17, 2018

(54) ACTUATOR FOR A MOTOR VEHICLE AND LOCKING DEVICE AND METHOD

(75) Inventors: Madhu S. Basavarajappa, Dusseldorf (DE); Nicolas Cavalie, Versailles (FR); Bernardo Erices, Bergisch Galdbach (DE); Frank Kunst, Lüdinghausen (DE)

(73) Assignee: Kiekert AG, Heiligenhaus (DE)

( * ) Notice: Subject to any disclaimer, the term of this patent is extended or adjusted under 35 U.S.C. 154(b) by 898 days.

(21) Appl. No.: 13/638,808

(22) PCT Filed: Jan. 19, 2011

(86) PCT No.: PCT/EP2011/050702
§ 371 (c)(1),
(2), (4) Date: Dec. 19, 2012

(87) PCT Pub. No.: WO2011/120719
PCT Pub. Date: Oct. 6, 2011

(65) Prior Publication Data
US 2013/0102163 A1    Apr. 25, 2013

(30) Foreign Application Priority Data

Mar. 31, 2010  (DE) .......................... 10 2010 003 523
Mar. 31, 2010  (DE) .......................... 10 2010 003 545
Sep. 9, 2010   (DE) .......................... 10 2010 040 522

(51) Int. Cl.
*B60K 15/05*     (2006.01)
*E05B 83/34*     (2014.01)
(Continued)

(52) U.S. Cl.
CPC .............. *B60K 15/05* (2013.01); *E05B 81/66* (2013.01); *E05B 83/34* (2013.01);
(Continued)

(58) Field of Classification Search
CPC ......... E05B 47/0001; E05B 2047/0073; E05B 2047/0081; E05B 81/04; E05B 81/06;
(Continued)

(56) References Cited

U.S. PATENT DOCUMENTS 4,331,353 A  *  5/1982  Yazawa ................... F16C 1/101
                                                    292/28
4,633,688 A  *  1/1987  Beudat ................ E05B 47/0012
                                                   292/142
(Continued)

FOREIGN PATENT DOCUMENTS

DE        28 47 588      5/1980
DE        39 28 580      4/1990
(Continued)

OTHER PUBLICATIONS

International Search Report for corresponding patent application PCT/EP2011/050702 dated Jul. 18, 2011.
(Continued)

*Primary Examiner* — Alyson M Merlino
(74) *Attorney, Agent, or Firm* — Renner, Otto, Boisselle & Sklar, LLP

(57) ABSTRACT

With the present invention, actuators known from the prior art are supposed to be developed further.
For this purpose, an actuator comprises, in particular, an electric motor and a locking bar that can be moved by means of the electric motor. Moreover, the actuator comprises a lever with which the locking bar can be moved back mechanically out of its locking position.
The invention moreover relates to a charging socket for an electrically driven motor vehicle. As is already known from a motor vehicle driven by an electric motor and an outlet provided in a private household, the electrical contacts of the charging socket are located protected in one or more recess(es). Into these recess(es), contacts of a charging plug
(Continued)

which correspond therewith and are, for example, pin or rod-shaped, can be pushed for contacting. An adjacent, in particular peripherally extending, housing is provided around the one or more recess(es). A gap-shaped space, which in particular extends peripherally around the recess(es) and into which a housing of a charging plug corresponding therewith can be pushed, thus remains between the recess(es) and the adjacent housing. An actuating element with a locking bar is attached on the outside of the adjacent housing. For locking a charging plug, the locking bar can be moved by the actuating element into the adjacent housing through a corresponding opening.

11 Claims, 10 Drawing Sheets

(51) Int. Cl.
  *E05B 81/66* (2014.01)
  *B60L 11/18* (2006.01)
  *E05B 81/24* (2014.01)
  *H01R 13/639* (2006.01)
(52) U.S. Cl.
  CPC .......... *B60K 2015/0538* (2013.01); *B60K 2015/0561* (2013.01); *B60K 2015/0576* (2013.01); *B60K 2015/0584* (2013.01); *B60L 11/1818* (2013.01); *B60L 11/1824* (2013.01); *B60L 2270/32* (2013.01); *B60L 2270/34* (2013.01); *E05B 81/25* (2013.01); *H01R 13/639* (2013.01); *H01R 2201/26* (2013.01); *Y02T 10/7072* (2013.01); *Y02T 90/121* (2013.01); *Y02T 90/14* (2013.01); *Y10T 29/49105* (2015.01); *Y10T 29/49208* (2015.01)
(58) Field of Classification Search
  CPC .......... E05B 81/90; E05B 81/64; E05B 81/66; E05B 81/72; E05B 83/34; E05B 15/0053; E05B 15/006; E05B 15/008; E05B 77/34; E05B 81/14; E05B 81/25; B60K 15/05; B60K 15/0561; B60K 15/0576; B60K 15/0584
  USPC .............. 292/144, 137, 160, 159, 140, 142, 292/DIG. 11, 74, 76; 296/97.22, 155
  See application file for complete search history.

(56) References Cited

U.S. PATENT DOCUMENTS

| | | | | |
|---|---|---|---|---|
| 4,633,724 A | * | 1/1987 | Mochida | E05B 53/005 296/97.22 |
| 5,012,794 A | * | 5/1991 | Faurel | E05C 5/00 126/191 |
| 5,076,622 A | * | 12/1991 | Detweiler | E05B 47/023 292/125 |
| 5,080,421 A | * | 1/1992 | Otowa | B60K 15/03504 123/519 |
| 5,086,900 A | | 2/1992 | Kikuta et al. | |
| 5,222,774 A | * | 6/1993 | Fukumoto | E05B 81/14 292/144 |
| 5,236,233 A | * | 8/1993 | Fukumoto | E05B 47/0012 292/144 |
| 5,280,881 A | * | 1/1994 | Karmin | E05B 47/0012 292/142 |
| 5,493,099 A | * | 2/1996 | McWilliams | E05B 51/02 126/197 |
| 6,050,623 A | * | 4/2000 | Martus | E05B 47/026 292/171 |
| 6,554,344 B2 | * | 4/2003 | Son | B60K 15/05 296/97.22 |
| 7,059,159 B2 | * | 6/2006 | Lanigan | B62D 33/0222 292/144 |
| 7,647,797 B1 | * | 1/2010 | Viso Cabrera | E05B 47/0012 292/144 |
| 2002/0089187 A1 | | 7/2002 | Holloway | |
| 2011/0115239 A1 | * | 5/2011 | Imatomi | B60K 15/05 292/143 |
| 2011/0241360 A1 | * | 10/2011 | Kitamura | E05B 81/90 292/201 |
| 2013/0154402 A1 | * | 6/2013 | Basavarajappa | B60K 15/05 310/20 |

FOREIGN PATENT DOCUMENTS

| | | | |
|---|---|---|---|
| DE | 42 10 084 | 10/1992 | |
| DE | 102 59 465 | 7/2003 | |
| EP | 0 195 548 | 9/1986 | |
| JP | 63-187562 | 12/1988 | |
| JP | 08-162208 | 6/1996 | |
| JP | 2007-107227 | 4/2007 | |
| JP | 2009-084994 | 4/2009 | |
| JP | 4277441 B2 * | 6/2009 | ......... E05B 15/0053 |
| WO | 87/04213 | 7/1987 | |
| WO | 2009/143799 | 12/2009 | |

OTHER PUBLICATIONS

Office Action for corresponding Japanese patent application 2013-501698 dated Nov. 4, 2014.

* cited by examiner

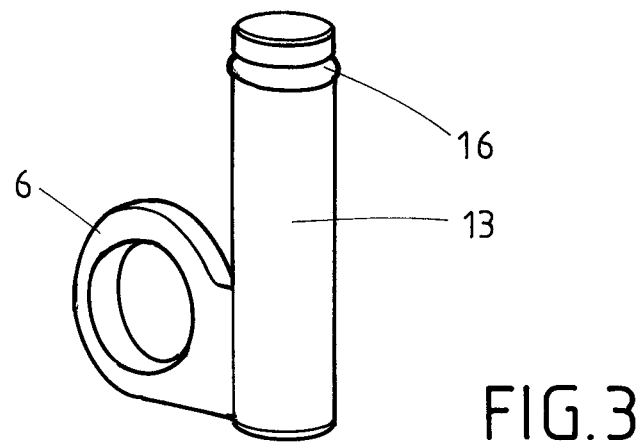
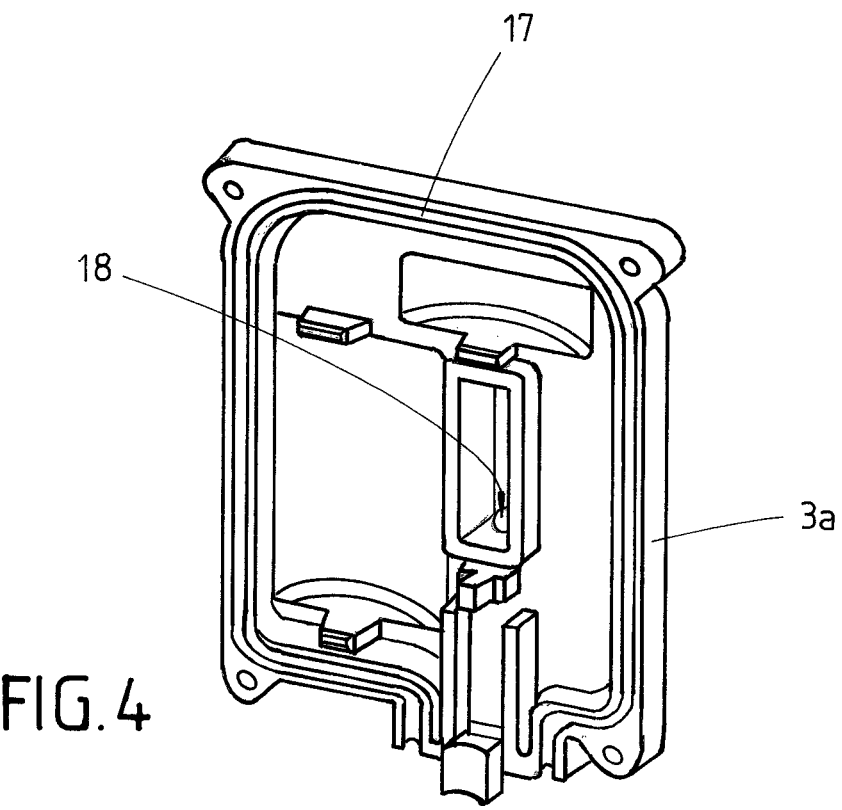

ACTUATOR FOR A MOTOR VEHICLE AND LOCKING DEVICE AND METHOD

FIELD OF THE INVENTION

The invention relates to an actuator, particularly for a motor vehicle, which is known, for example, from the documents DE 101 42 134 A1 and DE 10 2004 063 814 A1. The invention moreover relates to a method for producing an actuator.

In addition, the invention relates to a locking device for a motor vehicle. A locking device comprises an actuating element and a locking bar that can be displaced by means of the actuating element. A locking device in particular locks a charging socket with a charging plug in order to charge a battery of an electrically driven motor vehicle.

BACKGROUND OF THE INVENTION

A battery of an electric or hybrid motor vehicle is charged by means of an externally accessible charging socket. During a charging process it should be possible to ensure that the corresponding charging plug inserted into the charging socket cannot be removed by an unauthorized person and that the charging process can be carried out safely.

A locking device for a charging socket and charging plug capable of giving protection against unauthorized removal of the charging plug is evident from document DE 196 42 687 A1. For this purpose, this locking device has an actuating element or actuator with which a locking bar can be adjusted to lock the charging plug. The actuator serves for locking a connection of a charging plug and a charging socket for charging the battery of an electric motor vehicle. This is done either by locking a pivoting lid, or by directly locking the charging plug. This device takes up a relatively large constructional volume. It can be optimized with regard to the protection against moisture.

Document DE 102 59 465 A1 discloses an actuator for a fuel filler lid lock of a motor vehicle with an electric motor capable of turning a spindle. A rotary movement of the spindle causes a linear displacement of a locking bar. The locking bar is sealed towards the outside by a bellows in order to protect the actuator against moisture and dirt. However, the bellows provides for a relatively large construction space.

Document DE 102 14 398 A1 discloses a device which can be used, for example, for locking/unlocking door locks of motor vehicles, the device being equipped with a shape-memory member.

In actuators with an electrically displaceable locking bar, there is the problem that there is no possibility of unlocking if the associated electrical or electronic system is damaged.

SUMMARY OF THE INVENTION

It is a first object of the invention to provide an enhanced actuator. Preferably, it is supposed to be possible to be able to maintain a desired operation to as large an extent as possible even in case of malfunction. In one embodiment, an enhanced actuator is supposed have a small construction space and/or be protected against dust and moisture. Independently of the first object, it is moreover a second object of the invention to provide an enhanced locking device for a motor vehicle.

The subject matter of the main claim achieves all the objects.

The first object of the invention is achieved by a subject matter of claim 1 as well as by subject matters having the features of co-ordinated claims directed to an actuating element. The second object is achieved, in particular, by the locking device for which protection is sought in accordance with the co-ordinated claims that relate to a locking device. A manufacturing process for such an actuator includes the features of the co-ordinated claim.

In order to achieve the first object, an actuator comprises an electrically displaceable locking bar. For example, the actuator comprises an electric motor in order to move the locking bar into a locking position, for example in the manner known from document DE 102 59 465 A1. However, a locking bar can also be electrically moved in another manner, for example by means of an electromagnet. Moreover, the actuator comprises a lever with which the locking bar can be moved back mechanically, actuated manually, out of its locking position. Thus, a person is able to grip the lever on a handle member, for instance, and by hand move it in such a way that the locking bar is thereby moved into its non-locking position.

In the case of a motor vehicle, there is a need to be able to lock components, particularly such components that are accessible from the outside. A lid for covering a filler neck that can be closed with a lid in order thus to protect the tank against unauthorized access is an example for such a component. A lock of a connection between a charging socket of an electric vehicle and a charging plug, for the reasons known from document DE 196 42 687 A1, is another example.

Such a locking process can be carried out in a convenient and even automated manner by means of an electric drive unit. For automatic locking, a charging socket, for example, comprises a sensor capable of detecting if a charging plug has been fully inserted into the charging socket. The sensor then activates the electrical drive unit, which then moves the locking bar into its locking position.

However, in the event of a malfunction of the electrical or electronic system of an actuator, then unlocking is no longer possible by means of the electrical drive unit. In the case of a lid covering a filler neck, however, unlocking is necessary in order to be able to move a vehicle in spite of an electrical or electronic system malfunctioning in this manner. In the case of a locked connection between a charging socket and a charging plug, unlocking also must be possible in a reliable manner, irrespective of malfunctions of the electrical or electronic system in order to be able to continue to drive the vehicle within a short period of time following a charging process. For this reason, the actuator according to the invention comprises a lever with which the locking bar can be moved, actuated manually, out of its locking position by means of a mechanism. Thus, the actuator according to the main claim as well as according to the first co-ordinated claim comprises an emergency release mechanism that can be actuated manually.

The lever can and should be arranged in such a way that it can be operated only from within the vehicle, either directly or indirectly, for example by means of a Bowden cable, in order to move a locking bar into its non-locking position. Because motor vehicles are, as a matter of principle, designed in such a way that at least one vehicle door and/or lid can also be opened in a purely mechanical way by means of a key, a user of the motor vehicle can gain access to the interior of his motor vehicle even if an electrical or electronic system provided for locking is malfunctioning. Then, the vehicle user is able to manually actuate the above-mentioned lever of the actuator from the interior in order to move the locking bar out of its locking position. If necessary, a vehicle can then be refueled, or a charging plug can be removed from a charging socket, in order to reliably be able to continue a drive with the vehicle within a short period of time.

In a particularly simple embodiment of the invention, the lever consists of a bolt with a handle mounted thereon or an eyelet mounted thereon for hooking up a Bowden cable. The bolt is guided in a channel of the actuator and can be moved against a projection connected to the locking bar and/or contacts this projection at least when the locking bar has been moved into its locking position. The handle member or the eyelet can be accessed and moved from the outside (i.e. outside the actuating member). The handle member can be moved in such a way that the bolt moves the projection, and thus also the locking bar, out of its locking position.

If a bolt of the locking bar is disposed in a channel, the bolt advantageously comprises a sealing ring capable of sealing a passage between the bolt and the channel. Thus, it is possible to prevent moisture from entering the interior of the actuator via the channel and from being able to affect the functionality of the electrical and/or electronic system located therein.

Moreover, the housing of the actuator is sealed in a dust-tight and moisture-tight manner, at least in the fitted state. In contrast to the prior art known from DE 102 59 465 A1, however, the locking bar is preferably not sealed by a bellows, but by a flat sealing collar resting against the housing of the bellows. The required construction space is thus considerably reduced as compared with the prior art known from DE 102 59 465 A1. In the fitted state, the actuator can be pressed with its sealing collar against a wall of a component, whereby the connection between the wall of the component and the actuator is sealed in a highly moisture and dust-tight manner, particularly in comparison with the prior art known from DE 102 59 465 A1. Pertinent standards relating to moisture and dirt protection can be satisfied without any trouble.

In one embodiment, the space of the component into which the locking bar extends for locking also is or can be sealed in a dust-tight and moisture-tight manner. An example for such a component with a space into which the locking bar of an actuator extends, and which can be sealed in a moisture and dust-tight manner, is evident from the German patent application 102 01 000 3523.8. In particular, such a component is a charging socket for an electric vehicle, which can be suitably sealed in a dust-tight and moisture-tight manner, either by means of a lid or by a charging plug. We incorporate the content of the disclosure of the German patent application 102 01 000 3523.8 into the present application. On the whole, an overall device with a driving element is thus provided which, compared with the prior art known from DE 102 59 465 A1, has a much smaller construction space and is very well protected against moisture and dirt, especially compared with this prior art.

In one embodiment of the invention, the actuator comprises a sensor, for example a microswitch, which is capable of detecting the position of the locking bar. To this end, the locking bar can be connected to a ramp which is capable of operating a microswitch when the locking bar is moved out of its locking position. Conversely, the ramp can also be arranged in such a way that it operates the microswitch when the locking bar is moved into its locking position. The sensor can be connected to a display which is disposed, for example, in the vehicle interior. The vehicle user of a vehicle can thus obtain information as to which position the locking bar of the actuator is assuming.

Moreover, the actuator can comprise a biased spring which, due to its bias, is capable of moving the locking bar into a predetermined direction, such as into the locking position, for instance. Thus, a supplementary mechanical means is provided in order to be able to move the locking bar into its locking position also in a mechanical way, for example subsequent to a release of a block of the lever according to the claim. Thus, the functionality of the actuator can be ensured in a further improved manner.

On the whole, such an actuator can be constructed to be very small. In particular, an actuator according to the invention is a part of a lock for a lid with which a filler neck is covered, or a part of a lock for a charging socket of an electrically driven motor vehicle with a charging plug. If, in one embodiment of the invention, the actuator serves for locking a connection between a charging socket of an electric vehicle and a charging plug, the locking bar, for the purpose of locking, preferably extends into a recess or into a hole in a housing wall of the charging plug in order thus to cause the locking action in a simple and compact manner. Preferably, the actuator is in that case attached from the outside to a housing wall of the charging socket. Furthermore, it is to be preferred that the charging socket and plug are designed in such a way that they are connected by a purely translatory movement. Thus, no rotary movement in the manner known from DE 196 42 687 A1 is required for connection. This embodiment of the invention requires a relatively small construction space because no space for rotary movement in a housing needs to be provided, which simultaneously offers protection against inadvertent touching of the electrical contacts.

The actuator can also comprise several locking bars in the event a component is supposed to be locked particularly securely.

In order to achieve the object, an actuator with the features of a coordinated claim comprises a locking bar displaceable by means of a drive unit. The locking bar can be moved back and forth between an initial position and a locking position by means of a drive unit. In particular, the drive unit is an electric drive unit. However, it may also be a pneumatic drive unit, for instance, or a drive unit which converts heat into mechanical energy, for example by means of a shape-memory alloy. However, the drive unit can move the locking bar into one direction also purely electrically. The movement in the other direction then takes place by means of a biased spring.

Thus, the actuator comprises, for instance, the biased spring described in the unpublished German patent application 10 2010 029 446, which, due to its bias, is capable of moving the locking bar into a predetermined direction, for instance into the locking position. In that case, the locking bar can be moved by the spring into its locking position, for instance, in particular subsequent to a block being released. We incorporate the content of the disclosure of this German application 10 2010 029 446 into the content of the disclosure of the present application.

If a drive unit in the sense of the present application is provided, then the corresponding work for moving the locking bar does not have to be done manually. For example, the drive unit is an electric motor for moving the locking bar into a locking position, for example in the manner known from document DE 102 59 465 A1. However, a locking bar can also be electrically moved in another manner, for example by means of an electromagnet.

Moreover, for achieving the object, the actuator comprises in a preferred embodiment a rotatably mounted lever with which the locking bar can be manually, i.e. actuated by hand, moved mechanically out of its locking position into its initial position by a rotary movement. Thus, a person is able to grip the lever on a handle member, for instance, and rotate it by hand in such a way that the locking bar is thereby moved into its non-locking initial position.

In the case of a motor vehicle, there is a need to be able to lock components, particularly such components that are accessible from the outside. A lid for covering a filler neck that can be closed with a lid in order thus to protect the content of the tank against unauthorized access is an example for such a component. A lock of a connection between a charging socket of an electric vehicle and a charging plug for charging the battery, for the reasons known from document DE 196 42 687 A1, is another example.

Such a locking process can be carried out in a convenient and even automated manner by means of an electric drive unit. For automatic locking, a charging socket, for example, comprises a sensor capable of detecting if a charging plug has been fully inserted into the charging socket. The sensor then activates the electrical drive unit which thereupon moves the locking bar into its locking position.

However, in the event of a malfunction of the electrical or electronic system of such an actuator, then unlocking is no longer possible by means of the electrical drive unit. In the case of a lid covering a filler neck, however, unlocking is necessary in order to be able to move a vehicle in spite of an electrical or electronic system malfunctioning in this manner. In the case of a locked connection between a charging socket and a charging plug, unlocking also must be possible in a reliable manner, irrespective of malfunctions of the electrical or electronic system in order to be able to continue to drive the vehicle within a short period of time following a charging process. For this reason, the actuator according to the invention comprises in one embodiment a rotatably mounted lever with which the locking bar can be moved, actuated manually, out of its locking position by means of a mechanism. Thus, the actuator according to the main claim as well as according to the corresponding co-ordinated claim comprises an emergency release rotary mechanism that can be actuated manually.

If the actuator according to the main claim as well as according to the corresponding co-ordinated claim is used in a motor vehicle, there is the problem that the actuator must be able to cope with extreme ambient conditions. On the one hand, such an actuator must be designed to withstand great temperature differences. Moreover, it must be designed so as not to be damaged by splash water, impacts, dust and stone chipping. In order to be able to satisfy such requirements, the lever provided for emergency release is rotatably mounted in one embodiment. A rotatable mounting, primarily in comparison to a displaceable mounting, can be designed to be tight with a particularly high degree of reliability, without moisture or dust being able to penetrate the seal or damage the seal. The rotatable lever is particularly advantageous primarily if the components of the actuating element accommodated within the housing of the actuating element are to be protected against dust and moisture.

In the case of a motor vehicle, the rotatable lever, which is provided in one embodiment for emergency release, can and should be arranged in such a way that it can be operated only from within the vehicle, either directly or indirectly, for example by means of a Bowden cable, in order to move the locking bar of the actuator into its non-locking position. Because motor vehicles are, as a matter of principle, designed in such a way that at least one vehicle door and/or lid can also be opened in a purely mechanical way by means of a key, a vehicle user of the motor vehicle can gain access to the interior of his motor vehicle even if the electrical or electronic system provided for locking is malfunctioning. Then, the vehicle user is able to manually actuate the above-mentioned rotatable lever of the actuator from the interior in order to move the locking bar out of its locking position. If necessary, a vehicle can then be refueled, or a charging plug can be removed from a charging socket, in order to reliably be able to continue a drive with the vehicle within a short period of time.

In a particularly simple embodiment of the invention, the rotatable lever comprises a rotatable internal lever connected to a rotatable external lever via a rotatably mounted axis. The internal lever is situated within the housing of the actuator and therefore cannot be manually actuated. The external lever is situated outside the housing of the actuator and therefore can be manually actuated. The rotatably mounted axis leads through the housing of the actuator. If the external lever is rotated, the rotary movement is transmitted via the axis onto the internal lever. The internal lever is capable of moving the locking bar into its initial position by means of a corresponding rotary movement. Such an embodiment realizes the desired emergency release in a technically particularly simple and reliable manner.

In one embodiment of the invention, the actuator comprises a latching mechanism which latches the locking bar in its initial position. The latching mechanism prevents the locking bar from moving into its initial position starting from its locking position and from being unwantedly moved back slightly due to a rebound. The latching mechanism avoids such an undesired rebounding effect in a technically simple manner. The locking bar is moved out of its latched position by the locking bar being moved towards the locking position with a sufficiently large force. This releasable latching connection with a latching mechanism in the case of an actuator constitutes an independent invention, which can be realized independently from the further features specified in the claims.

In one embodiment, the latching mechanism comprises a latching lug which latches into a latching groove when the locking bar is moved into its initial position and reaches it. The latching lug can be resiliently connected to the locking bar. In that case, a latching groove corresponding therewith is provided within the housing, into which the resiliently mounted latching lug has latched in the initial position. Conversely, the latching groove, however, can also be resiliently mounted instead of the latching lug, for example by a resilient attachment to an inner housing wall. It is also possible that a latching groove is connected to the locking bar, and an associated latching lug to the housing of the actuating element.

In one embodiment, the locking bar is latched in the locking position by one or by the already mentioned latching mechanism in order to prevent a return movement due to a rebound when the locking bar is moved into the end position. In that case, two correspondingly disposed latching grooves can be provided. In the initial position, the latching lug latches into the one end position. In the locking position, the latching lug latches into the other latching groove. However, two correspondingly disposed latching lugs can also be provided, as well as a groove in order to cause a latching action both in the initial position as well as in the locking position.

In one embodiment of the invention, a bolt of the locking bar has to be moved through an elastic constricted portion in order to be moved from the initial position into the locking position or, conversely, from the locking position into the initial position. The elastic constricted portion can be provided by a metal wire bent into a U-shape, with at least one leg of the U bulging inwards towards the other leg. By means of this embodiment, rebounding movements of the locking bar can be prevented particularly reliably.

In one embodiment of the invention, the end of the locking bar that is capable of protruding from the housing of the actuating element is beveled like the latch bolt of a lock. In that case, the locking bar can preferably be moved into the locking position by spring force. Such an actuating element can be used for closing a fuel filler lid, for example, in the same manner as this is done in the case of a door with a latching bold pushed out by spring force: Due to the inclined portion, the locking bar is first pushed back by the closing of the lid, in order to then spring back into the locking position due to the spring force, thus closing the lid. For pushing back, the lid can comprise a bolt behind which the locking bar finally returns into the locking position. In order to open the lid, the locking bar is generally moved electrically. Alternatively, the locking bar can be moved into its initial position by means of the rotatable lever in order to be able to open the lid again.

In one embodiment of the invention, the actuating element is used to move a latching bolt via, for instance, a Bowden cable—particularly out of the locking position—for example in order to be able to open a lid locked with the latching bold or to remove a charging plug locked with the latching bolt. In that case construction space for the actuating element does not have to be provided directly at the lid or at the charging socket.

In one embodiment of the invention, the actuator comprises a sensor, for example a microswitch, which is capable of detecting the position of the locking bar, particularly in the manner described in the unpublished German patent application 10 2010 029 446. To this end, the locking bar can be connected to a ramp which is capable of operating a microswitch when the locking bar is moved out of its locking position. Conversely, the ramp can also be arranged in such a way that it operates the microswitch when the locking bar is moved into its locking position. The sensor can be connected to a display which is disposed, for example, in the vehicle interior. The vehicle user of a vehicle can thus obtain information as to which position the locking bar of the actuator is assuming.

On the whole, such an actuator can be constructed to be very small. In particular, an actuator according to the invention is a part of a lock for a lid with which a filler neck is covered, or a part of a lock for a charging socket of an electrically driven motor vehicle with a charging plug. If, in one embodiment of the invention, the actuator serves for locking a connection between a charging socket of an electric vehicle and a charging plug, the locking bar, or a locking bar remotely actuated by means of the actuating element, for the purpose of locking, preferably extends into a recess or into a hole in a housing wall of the charging plug in order thus to cause the locking action in a simple and compact manner. Preferably, the actuator is in that case attached from the outside to a housing wall of the charging socket. Furthermore, it is to be preferred that the charging socket and plug are designed in such a way that they are connected by a purely translatory movement. Thus, no rotary movement in the manner known from DE 196 42 687 A1 is required for connection. This embodiment of the invention requires a relatively small construction space because no space for rotary movement in a housing needs to be provided, which simultaneously offers protection against inadvertent touching of the electrical contacts.

Moreover, the housing of the actuator is basically sealed in a dust-tight and moisture-tight manner, at least in the fitted state. The locking bar can be sealed by a bellows. However, a flat sealing collar resting against the housing of the actuator is preferred for such a seal in order to get by with a small construction space. In the fitted state, the actuator can be pressed with its sealing collar against a wall of a component, whereby the connection between the wall of the component and the actuator is sealed in a highly moisture and dust-tight manner. Pertinent standards relating to moisture and dirt protection can be satisfied without any trouble.

In one embodiment, the space of the component into which the locking bar extends for locking also is or can be sealed in a dust-tight and moisture-tight manner. An example for such a component with a space into which the locking bar of an actuator extends, and which can be sealed in a moisture and dust-tight manner, is evident from the unpublished German patent application 102 01 000 3523. In particular, such a component is a charging socket for an electric vehicle, which can be suitably sealed in a dust-tight and moisture-tight manner, either by means of a lid or by a charging plug. We incorporate the content of the disclosure of the German patent application 102 01 000 3523 into the present application. On the whole, an overall device with an actuator is thus provided which has a particularly small construction space and is very well protected against moisture and dirt.

The actuator can also comprise several locking bars in the event a component is supposed to be locked particularly securely. A reinforcing pin capable of stabilizing the projecting part of the locking bar can be provided in each locking bar.

In order to achieve the second object, a locking device comprises those features of the co-ordinated claims directed to a locking device. By means of the locking device according to the first corresponding co-ordinated claim, a first component is connected to a second one. The connection between the two components can be detached only after an unlocking process.

The locking device according to the first co-ordinated claim directed to a locking device is an actuating element with a locking bar, which is attached to a housing wall of a first component. A second component comprises a second housing wall. For locking, the housing wall of the second component is pushed into an opening of the housing wall of the first component. Then, the locking bar is pushed by the actuating element through a hole of the housing wall of the first component, and further into a hole or into a recess of the neighboring housing wall of the second component in order thus to interlock the two components. The two components can be detached from each other only when the locking bar has been moved back by the actuating element. Preferably, the actuating element of this locking device is designed as was already described.

For locking the two components, more than one locking bar can also be provided. For example, two locking bars can be provided which are moved by the actuating element in order to interlock the two components or unlock them from each other.

The two components charging socket and charging plug can thus be interlocked in an automated manner without having to provide a large construction space for this purpose. In one embodiment, at least one component is a part of a motor vehicle, particularly the first component. In particular, the first component is a charging socket. In that case, the second component is a charging plug. Further advantages and embodiments are described below with reference to the example of the charging socket and the charging plug.

As is already known from a motor vehicle charging outlet, the electrical contacts of a charging socket are located protected in one or more recess(es). Into these recess(es) contacts of a charging plug, which correspond therewith and are, for example, pin or rod-shaped, can be pushed for contacting. An adjacent, in particular peripheral, housing is provided around the one or more recess(es). A gap-shaped space, which in particular extends peripherally around the recess(es) and into which a housing of a charging plug corresponding therewith can be pushed, thus remains between the recess(es) and the adjacent housing. An actuating element with at least one locking bar is attached on the outside of the adjacent housing. For locking the charging plug, the locking bar can be moved by the actuating element into the adjacent housing through a corresponding opening, particularly perpendicularly relative to the adjacent housing wall. The same applies, mutatis mutandis, for another locking bar in the event there is more than one bar. The corresponding charge plug housing comprises a recess or a hole. The locking bar arrives in that recess or hole, whereby the connection between the charging plug and the charging socket is locked and the charging plug is secured against unauthorized removal. If a locked connection between the charging plug and the charging socket is to be detached, the locking bar is moved out of the recess or hole of the plug housing. Then, the plug can be removed.

Including its locking device, the charging plug requires a very small construction space, which is only insubstantially larger compared to the construction space that a charging socket would require that does not have any locking mechanism. The construction space of the associated charging plug is not enlarged, or at least only marginally, because only a recess for the locking bar has to be provided. The contacts of the charging socket are located in at least one recess which offers protection at any time against inadvertent touching of the contacts. If the adjacent housing of the charging socket extends around the recess(es), the construction space is slightly enlarged. However, it thus becomes possible to provide a particularly reliable protection against wet conditions at any time. Moreover, the connection between the charging socket and the inserted charging plug is mechanically stabilized.

In principle, the locking bar is electrically driven back and forth between its two positions by the actuating element, i.e. between its locking position and the position which enables a removal of a charging plug from the charging socket. Alternatively or additionally, however, purely mechanical means can also be provided for mechanically driving the locking bar back and forth between its two positions by the actuating means. In that case, the mechanism can preferably only be actuated from the interior of the vehicle in order thus to prevent actuation by unauthorized persons. In this embodiment, locking or unlocking a connection between the charging socket and the charging plug is possible even if a corresponding electrical system fails.

In one embodiment of the invention, the actuating element comprises a mechanism with which the locking bar can be mechanically moved out of, but not into, its locking position. This mechanism serves for a locked connection between a charging socket and an inserted charging plug also being capable of being unlocked if an electrical system provided for unlocking fails. Such a mechanism can easily be actuated via a Bowden cable connected to an actuating means provided in the interior of the vehicle.

In one embodiment of the invention, a lid with which the recess(es) can be closed is attached to the charging socket, particularly to the housing adjacent to the recess(es) of the charging socket. The recess(es) are thus protected against wet conditions and dirt if no charging plug is located in the charging socket. The lid can be attached so as to be outwardly pivotable, so that it protrudes from the vehicle in the opened state. The lid can be attached to be rotatable in such a way that it is moved within a single plane to open or close the recess(es). The lid can be designed to be lockable in order to protect the charging socket against vandalism. The lid can be provided with at least one sealing ring, which in particular consists of an elastic material, such as rubber, and which seals the recess(es) in an dust-tight and moisture-tight manner, or contributes to such a seal, when the charging socket is closed by the lid. Alternatively or additionally, the recess(es) can be provided with one or more such sealing rings that contribute to a dust-tight and moisture-tight seal when the lid closes the recess(es).

The lid and/or the socket can possess latching means that latch at a suitably situated latching stop when the lid closes the recess(es), in order thus to reliably fixate the lid in its closed position. For example, the lid can be biased towards its closed position by means of a biased spring, so that the lid is moved into its closed position when it is not externally prevented from doing so, for example by a charging plug inserted into the charging socket.

If the recess(es) are provided with one or more of the aforementioned sealing rings, they, in one embodiment, contribute to a dust-tight and moisture-tight connection between the charging socket and the inserted charging plug in order to protect the electrical contacts against moisture and dirt during charging. Alternatively or additionally, an associated charging plug can be provided with one or more sealing rings that are capable of protecting the electrical contacts against moisture and dirt during charging.

In one embodiment of the invention, an actuating element with a dust-tight and moisture-tight housing is provided. The housing can consist of two half-shells, with a sealing strip located between them in order to obtain a dust-tight and moisture-tight connection between the two half-shells. The driving means for being able to move the locking bar in an electrically driven manner are in that case located in the interior of the housing. The electrical contacts that lead outside and are required for a power supply are also sealed in such a way that no dust or moisture can enter the interior of the actuating element along these contacts. In that case, there still remains the region around the locking bar through which dust and moisture could enter the interior of the actuating element. In order to provide for a seal here, too, a flat sealing sleeve, which in particular consists of an elastic material, is provided, which is disposed between the housing wall of the actuating element and the adjacent housing wall of the charging socket, so that no dust or moisture can enter the actuating element between the two walls. If the charging socket is now also sealed in a dust-tight and moisture-tight manner, the entire system is protected absolutely reliably against entering moisture or entering dust. For example, the actuating element is screwed or riveted to the wall of the charging socket in order thus to create a firm, permanent connection.

An electrical contact between the charging socket and the charging plug can be established by connecting corresponding electrical conductors of the charging socket and the charging plug with each other. However, an inductive connection established by the charging socket and the charging plug for charging is also sufficient.

In one embodiment, the charging socket comprises a sensor, for instance in the form of a microswitch, which is capable of signaling if a charging plug has been fully inserted or pushed into the charging socket. The microswitch then activates, preferably automatically, the moving of the locking bar into its locking position.

In one embodiment, the charging socket is provided with a stop which butts against an element of the charging plug corresponding therewith when the charging plug has been pushed into the charging socket to a sufficient extent. The stop and the element corresponding therewith are preferably disposed so as to extend peripherally in such a way that a seal against external influences can thus be provided if the charging plug is located in the charging socket.

In one embodiment, the stroke of the locking bar is at least 10 mm, whereby a high level of theft protection is attained because the locking bar, for the purpose of locking, is in that case able to reach relatively deeply into a corresponding recess or hole of the charging plug.

In one embodiment, the actuating element is connected to a wireless receiver. If the receiver receives a corresponding signal from a wireless transmitter, the actuating element moves the locking bar out of its locking position. A legitimized user is thus able to unlock the locking bar by transmitting or triggering suitable wireless information.

In one embodiment, an actuating element is provided in the interior of the vehicle with which the unlocking can be triggered by the actuating element. If the vehicle is closed, an unauthorized person is thus prevented from unlocking the locking bar.

In one embodiment of the invention, the charging socket—as is known from a filler neck—is disposed within the body of a motor vehicle behind the lid, which is foldably mounted on the body. In that case, the charging socket does not protrude over the body and is nevertheless protected by a lid, which is important in the case of accidents.

In one embodiment of the invention, the charging socket and charging plug comprise electrical contacts for a power current outlet and/or electrical contacts for connection to a conventional electrical outlet customary in private households. The power current outlet generally differs from the contacts for conventional domestic electricity by suitably larger diameters. The contacts for a domestic outlet are, as a rule, connected to a rectifier. In the case of a power current, such a rectifier can be omitted, for instance, if the power current is provided as a direct current.

In one embodiment, the locking bar is biased towards its locking position by a spring. The end of the locking bar projecting from outside towards the charging socket, in particular, possesses a ramp. If a charging plug is moved into the charging socket, the biased locking bar is pushed back against its spring force towards the unlocking position due to a ramp provided therefor. If the charging plug is finally moved into its end position in the charging socket, the locking bar is moved by the spring force into the hole or recess provided in the charging plug and thus locks the connection between the charging socket and the charging plug. Moreover, the end projecting into the charging socket is designed in such a way that the charging plug can no longer be pulled out. Instead, this is possible only when the actuating element moves the locking bar out of its locking position.

It is conceivable that the contacts of the charging socket project outwards from their recesses. However, this is not very expedient because accordingly, these outwardly projecting ends are unprotected. It is therefore to be preferred that the contacts are completely situated in recesses.

An associated charging plug preferably also has recesses in which the contacts of the charging plug are respectively located, for example in order to reliably protect against inadvertent touching. The recesses of the charging plug and the charging socket are then pushed into one another, as a rule, when the charging plug is connected to the charging socket and all contacts are located completely in the associated recesses.

The actuator can comprise an electric motor in order to move the locking bar, for example in the manner known from document DE 102 59 465 A1. The actuator can comprise a shape-memory member in order to move the locking bar, for example in the manner known from document DE 102 14 398 A1. In a third embodiment, the actuating element is able to move the locking bar in the desired manner using only magnetic forces. The housing of the actuator can comprise a membrane capable of compensating pressure differences. The membrane can have a smooth surface. The membrane can have an undulated surface in order to be able to compensate even small pressure differences between the internal pressure in the housing and the external pressure.

In one embodiment, an actuator is assembled as follows:
Inserting a first sealing ring into a peripherally extending groove of a housing half or injecting a first sealing ring into a peripherally extending groove or furrow of a housing half.
Optionally inserting a membrane into an optionally provided opening of a housing half. A peripherally extending groove, which serves for connection to the housing half, can be provided on the outer circumference of the membrane. It is not imperative that the membrane is provided. Thus, the membrane may be omitted if no pressure compensation is deemed necessary.
Optionally inserting a microswitch that is, in particular, solder-connected for electrical connection, namely to conductor paths located in the housing or worked into the housing and leading to the connection socket of the housing. Moreover, the microswitch can also be potted with a mass suitable for this purpose in order to protect the microswitch against external influences, such as moisture. Providing a microswitch is necessary only if the position of the locking bar is to be determined. Otherwise, the microswitch can be omitted.
Inserting an electrically drivable motor into a housing half, the motor comprising a drive spindle or drive gear. The motor is also contacted with conductor paths via which the motor is supplied with power. In principle, these conductor paths also lead to the above-mentioned connection socket.
Optionally fitting a spring cassette, the fitting of the spring cassette comprising the steps of:
biasing the spring of the spring cassette, and
Inserting the spring cassette with a biased spring.
The spring of the spring cassette is biased so that the locking bar can be moved by means of the spring from one position into the other position solely due to spring force. Such a spring cassette with a spring is provided particularly if the locking bar can be pushed into the non-locking position by means of a ramp-like inclined portion, particularly against the spring force, similar to a latching bolt of a door lock of an apartment door. In that case, the spring of the spring cassette ensures that the locking bar is moved into this locking position in the unbiased state. However, providing a spring cassette is not imperative. Thus, a spring cassette can be omitted if the locking bar is supposed to be moved solely by means of the electric motor.

Connecting a spindle to a frame and locking bar.

Inserting a spindle with a drive wheel or gear mounted thereon, together with a frame and locking bar into a housing half. In that case, the drive wheel or gear of the spindle can be driven by the drive spindle or gear of the motor.

Inserting a sealing ring into the inner face of a sealing sleeve and inserting a sealing ring configured as a flat gasket into the inner face of the sealing sleeve.

Applying, particularly gluing, a sealing ring onto the outer face of the sealing sleeve. Gluing is to be preferred because in that case, the sealing ring is reliably attached to the outer face.

Inserting an internal lever with an axis connected thereto into a housing half from the inside. If the internal lever is inserted, the axis extends through the housing half.

Optionally placing a sealing ring onto the axis of the internal lever. The sealing ring is required only if access to the housing is supposed to be sealed. The sealing ring can have been put on already before the internal lever has been inserted. In another embodiment, the sealing ring is placed on, from the outside, not until the internal lever has been inserted prior to that.

Placing an external lever on and connecting it to the axis of an internal lever, particularly by positive fit and a snap-on mechanism. In that case, the axis of the internal lever is designed, at the respective end, in such a way that a connection with the external lever in a positive fit is possible. The axis can comprise, for example, two flexible hooks that are pressed inwards when the external lever is placed on. If the external lever has reached its end position, the hooks snap back. The external lever is then firmly connected to the axis of the internal lever by a snap-on connection.

Joining the two housing halves.

Attaching the sealing sleeve with the attached sealing rings to the locking bar.

Screw-connecting the two housing halves (3a, 3b).

A first preferred field of application of the actuating element is locking an electric charging plug to a electric charging socket for an electric vehicle. A battery of the electric vehicle is charged by means of the charging plug and charging socket. In that case, the locking bar of the actuating element does not comprise, as a matter of principle, a ramp-like inclined portion that enables the locking bar to be pushed back into its locking position. In that case, the locking bar is moved back and forth between its locking position and its non-locking position solely by the drive unit.

A second preferred field of application of the actuating element is locking a lid in order to cover a filler neck and the like in a motor vehicle by means of the lid. In this case particularly, the locking bar has the form of a ramp, i.e. an inclined portion, at a corresponding end, which enables the locking bar to be pushed back, in particular against a spring force. In the case of the inclined portion, the aforementioned spring cassette, in particular, is therefore provided. In the case of locking a charging plug with a charging socket, this spring cassette is omitted.

Particularly in the case of a lock for the charging plug and the charging socket, the actuating element comprises a microswitch with which the position of the locking bar can be determined. As a matter of principle, this microswitch is omitted in the case of locking a lid.

BRIEF DESCRIPTION OF THE DRAWINGS

Exemplary embodiments are explained in more detail below. Further embodiments and advantages of the invention are illustrated with reference thereto.

In the Figures:

FIG. 3: shows a lever

FIG. 4: shows a housing shell

FIG. 1 shows an actuator 1 with a connection socket 2, via which the actuator can be connected to an electrical power source. The actual drive unit for the locking bar is accommodated within the housing. The housing consists of two half shells 3a and 3b that are connected to each other with four screws. A preferably strip-shaped seal consisting, for example, of rubber or another elastic material, is located between the two half shells 3a and 3b in order to connect the two half shells 3a and 3b with each other in a dust-tight and moisture-tight manner. A stretchable membrane 3c can be part of the half shell 3a in order to be able to compensate any pressure differences. The membrane consists of a stretchable material. If very small pressure differences are also to be compensated, the membrane 3c consisting of flexible material comprises at least one annularly extending wave crest and/or at least one annularly extending wave trough. Preferably, there are several annularly extending wave troughs and wave crests.

Figure 1:
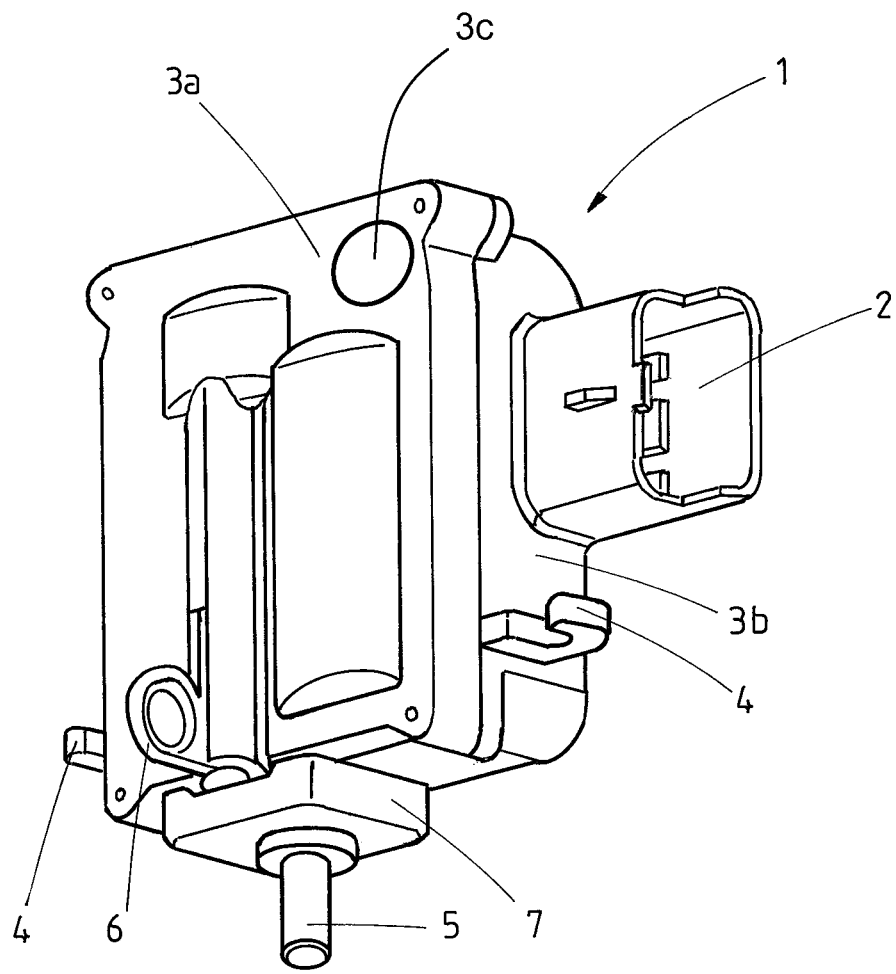
FIG. 1: shows an actuator from the outside

The housing 3a, 3b comprises two projecting tabs 4 which are attached to opposite walls of the housing and are bent in a U-shape. The tabs 4 serve for attaching the actuator 1, for example by means of screws, to another component, such as to a charging socket of a motor vehicle, for example, via which a battery of an electrically driven motor vehicle can be charged. The actuator 1 comprises a locking bar 5 which can be linearly displaced by an electric motor located in the housing 3a, 3b. An eyelet 6 of a lever projects from a lateral wall of the housing 3a, 3b, by means of which the locking bar 5 can be moved mechanically back towards the housing 2, starting from its locking position projecting over the housing 3a, 3b. The eyelet 6 can be easily captured and moved by manual actuation, for example by means of a Bowden cable hooked into the eyelet 6 in a manner suitable therefor.

In one exemplary embodiment, the stroke of the locking bar is at least 10 mm in order to be able to lock a desired component, such as a fuel filler lid or a connection between a charging plug and a charging socket, particularly reliably and securely by means of the locking bar.

A sealing sleeve 7, which is pressed tightly against a component to which the actuator is attached, and which is placed on the housing 3a, 3b from the outside, extends around the locking bar 5. The sealing sleeve contributes to dust and moisture being incapable of entering the interior of the actuator, so that pertinent standards, particularly also the standard IP 67, can be satisfied. Due to its flat shape, the sealing sleeve moreover virtually does not enlarge the required construction space.

Figure 2:
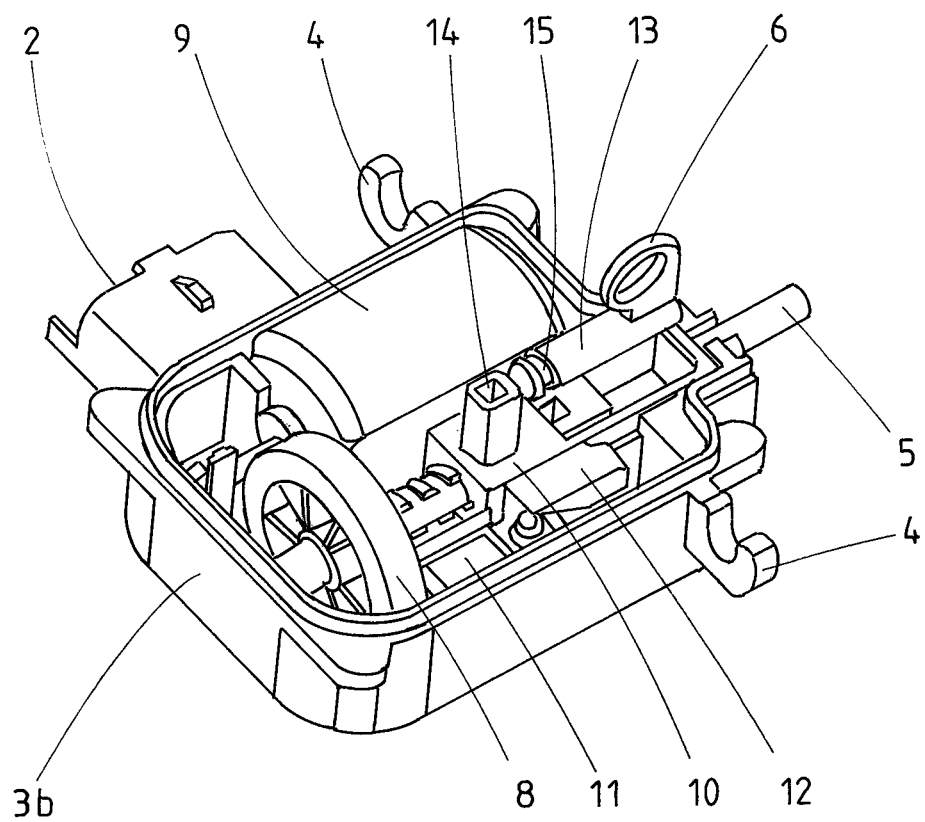
FIG. 2: shows an actuator from the inside

FIG. 2 illustrates the actuator from FIG. 1 without the housing half or housing shell 3a. As is already known from DE 102 59 465 A1, a thread spindle 8 located therein can be driven by an electric motor 9 located therein.

A rotary movement of the spindle causes a translatory, i.e. linear, movement of the carriage 10. A sensor, i.e. a microswitch 11, is disposed adjacent to the thread of the spindle. A ramp 10 is mounted on the carriage 12. The microswitch is actuated by the ramp 12 by a translatory movement of the carriage 10, and the position of the carriage 10, and consequently also the position of the locking bar 5 connected thereto, is thus detected. In the illustrated example, the ramp is arranged in such a way that the microswitch 11 is actuated when the locking bar 5 is moved out of its locking position, i.e. back into the housing 3a, 3b.

One or both of the housing halves 3a and 3b provide a channel through which the bolt 13 of the lever with the eyelet 6 is guided. The end of the bolt 13 opposite from the eyelet 6 is capable, given a corresponding movement, of pushing against a projection 14 of the carriage 10 and move back the latter in such a way that the locking bar 5 connected to the carriage is moved out of its locking position. A peripherally extending furrow 15 with a sealing ring 16 located therein—as shown in FIG. 3—is provided adjacent to this end of the bolt 13. The sealing ring 16 provides for a moisture-tight and dust-tight connection towards the adjacent peripherally extending channel wall. If required, several sealing rings for the bolt, disposed one behind the other, can also be provided.

As FIG. 4 illustrates, the housing half 3a comprises an inner peripherally extending furrow 17 into which an, in particular elastic, sealing strip is inserted. Along this strip, there is then a moisture-tight and dust-tight connection between the two housing halves 3a and 3b. Furthermore, the housing half 3a comprises a channel-shaped bore 18 for guiding the bolt 13.

DETAILED DESCRIPTION OF THE INVENTION

An actuator can thus be successfully provided which is only 60 mm in length when the locking bar is located in the housing, and which can be even shorter. If the locking bar 5 is moved out of the housing into its locking position, the length is extended by 10 mm. Without the electrical connector 2, the maximum required width is 47 mm. Not including the eyelet 6, the thickness is no more than 30 mm.

In the manner known from DE 102 59 465 A1, the spindle of the actuator can be connected to a suitably biased spring which is capable of rotating the spindle in such a way that the locking bar can thereby be moved into a desired direction.

Figure 5:
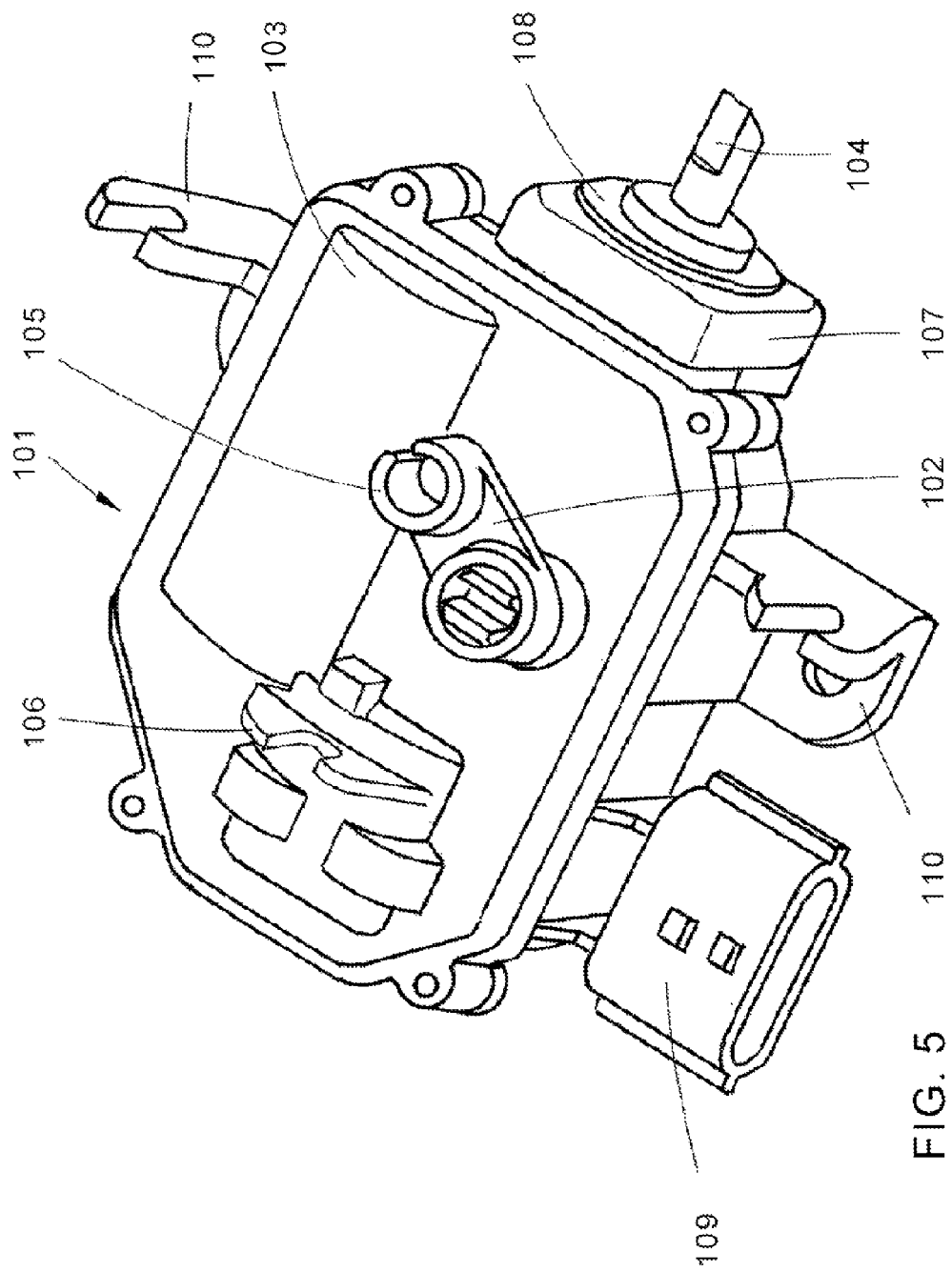
FIG. 5: shows an actuator with an emergency release device comprising a rotatable lever

FIG. 5 shows an actuator 101 with a rotatable lever 102 disposed outside the housing 103 of the actuator 101. The actuator 101 comprises a lever 104 which is shown in its locking position in FIG. 5. In its locking position, the locking bar 104 extends out of the housing 103. If the rotatable lever 102 is rotated counter-clockwise, then, due to a mechanical connection, the locking bar 104 is moved towards the housing 103 and thus towards its end position. The lever 102 comprises an eyelet 105 into which the end of a Bowden cable can be hooked. Moreover, a hooking portion 106 is provided on the same surface of the housing 103 in order to be able to suitably hook in the outer sheath of a Bowden cable here. The lever 102 can then be rotated counter-clockwise, remotely controlled, by means of the hooked-in Bowden cable, for example to be able to actuate the emergency release device from within a vehicle.

At the locking bar 104, the housing 103 is moreover provided with a flat sealing sleeve 107. A sealing ring 108 may be provided additionally in order to be able to particularly reliably press the actuating element tightly against a wall of a further component.

The actuating element 101 comprises a socket 109 with electrical contacts located therein in order to be able to connect it to an electrical plug. Through it, the actuator 101, particularly the drive unit and—if provided—electrical or electronic sensors, are supplied with power, in order to be able to move the locking bar 104 by means of an electrical drive unit and optionally supply sensors with power and/or forward signals of the sensors. In order to be able to attach the actuator 101, the housing 103 comprises laterally projecting tabs 110. A wall of the tab 110 is disposed parallel to the base area of the housing 103 of the actuator 101. A perpendicular wall, which extends perpendicularly to the base area of the housing 103, is adjacent thereto. Both walls of the tabs 110 comprise a recess or bore, in order to be able to attach the actuator to another component by means of a screw-connection, for example, in different positions depending on the respective requirements.

Figure 6:
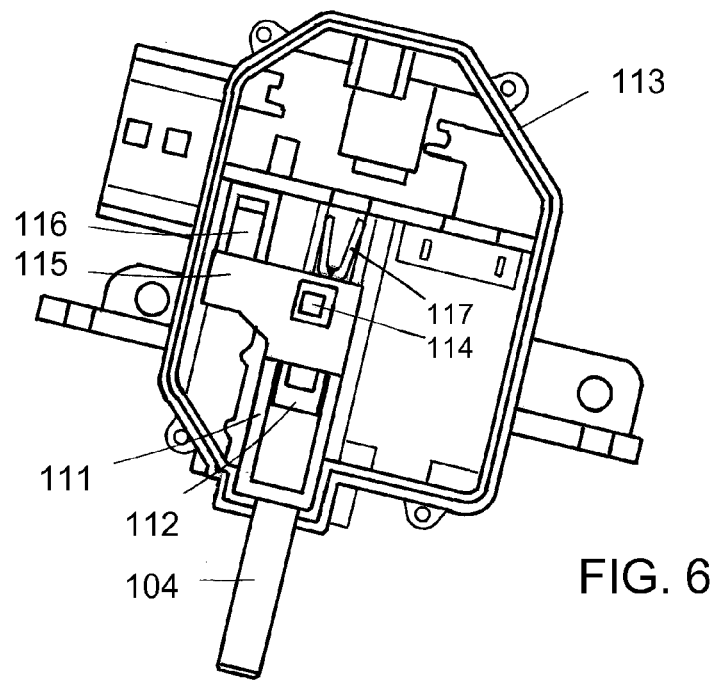
FIG. 6: shows the guidance of the locking bar of the actuator

FIG. 6 illustrates the guidance of the locking bar 104 within the housing. The region of the locking bar 104 that can be extended out of the housing is connected to a rectangular frame 111. A guide member 112 of the housing or of the housing half 113 is located within the frame 111. The end of the frame 111 which is disposed opposite from the projecting part of the locking bar 104 comprises a bolt 114, which in FIG. 6 projects upwards, and a laterally projecting arm 115 with a ramp-shaped underside. Depending on the position of the locking bar 104, the lateral arm 115 actuates a microswitch 116. The position of the locking bar 104 can be electronically detected by the microswitch 116.

There is, in the region serving for guiding the locking bar 104, a spring bent in a U-shape, or an elastically behaving wire 117 bent in a U-shape. The legs of the wire 117 bulge towards the inside. The cooperation between the locking bar 104 and the spring 117 is shown in FIG. 7.

Figure 7:
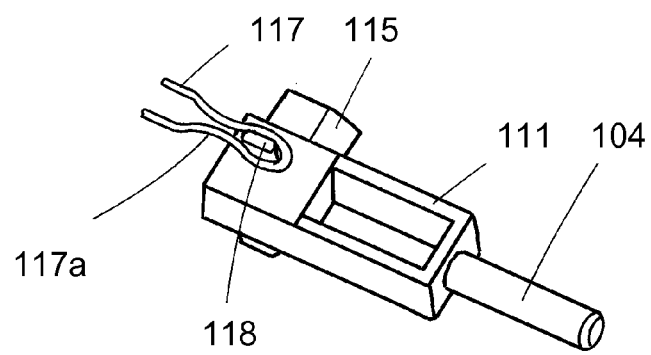
FIG. 7: shows the locking bar and the U-shaped spring of the actuator

In this FIG. 7, it is illustrated that there is another bolt 118 of the locking bar 104 which protrudes towards the spring 117 and extends in between the legs of the spring 117. If the locking bar 104 is moved from its initial position into the locking position or vice versa, the bolt 118 has to bend the narrowed portion of the spring 117, which is provided by the bulge or indentation 117a, outwards against a spring force in order to arrive at the respectively other position. Thus, the locking bar is retained in the respective position (initial position or locking position) by the spring 117. Any perceptible movement of the locking bar due to a rebounding effect is prevented by the spring 117.

Figure 8:
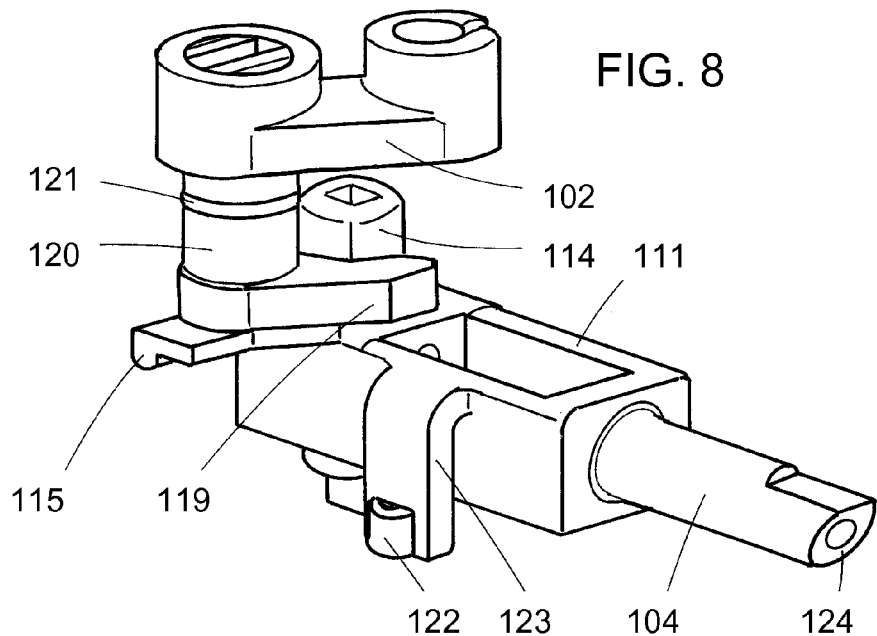
FIG. 8: shows the mechanism of the emergency release device

FIG. 8 shows in which way the locking bar 104 can be moved from the locking position into the initial position by means of the rotatable external lever 102. For this purpose, the external lever 102 is connected to an internal lever 119 via an axis 120. The internal lever 119 rests against the projecting bolt 114 of the locking bar 104. If the external lever 102 is turned in a counter-clockwise direction as described, this rotary movement is transmitted onto the internal lever 119. The internal lever 119 captures the bolt 114 and thus moves it into the initial position together with the locking bar 104. The axis 120 connecting the internal lever 119 to the external lever 102 comprises a sealing ring 121. Using the sealing ring 121, the axis 120 is successfully sealed in a dust-tight and moisture-tight manner against the housing of the actuator, so that no dust or moisture can enter the interior of the housing 103 of the actuating element 101 along this axis 120.

The embodiment of the locking bar 104 shown in FIG. 8 comprises a latching lug 122 which, via an arm 123, is resiliently attached to the frame 111. The region of the locking bar 104 that in the locking position projects over the housing 103 is provided at its end with an inclined portion 124 that is capable of acting like an inclined portion of a latching bolt of a lock.

Figure 9:
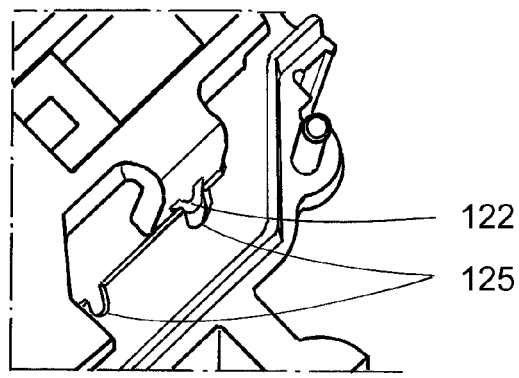
FIG. 9: shows the locking bar with a latching lug for latching into latching grooves

FIG. 9 illustrates the mode of operation of the resilient arm 123 with the latching lug 122 attached thereto. The latching lug 122 is able to latch into a recess or latching groove 125, both in the initial position as well as in the locking position. Additionally, this latching connection ensures that the locking bar 104 is very reliably retained in its locking position or in its initial position. Rebounding effects are thus avoided.

Figure 10:
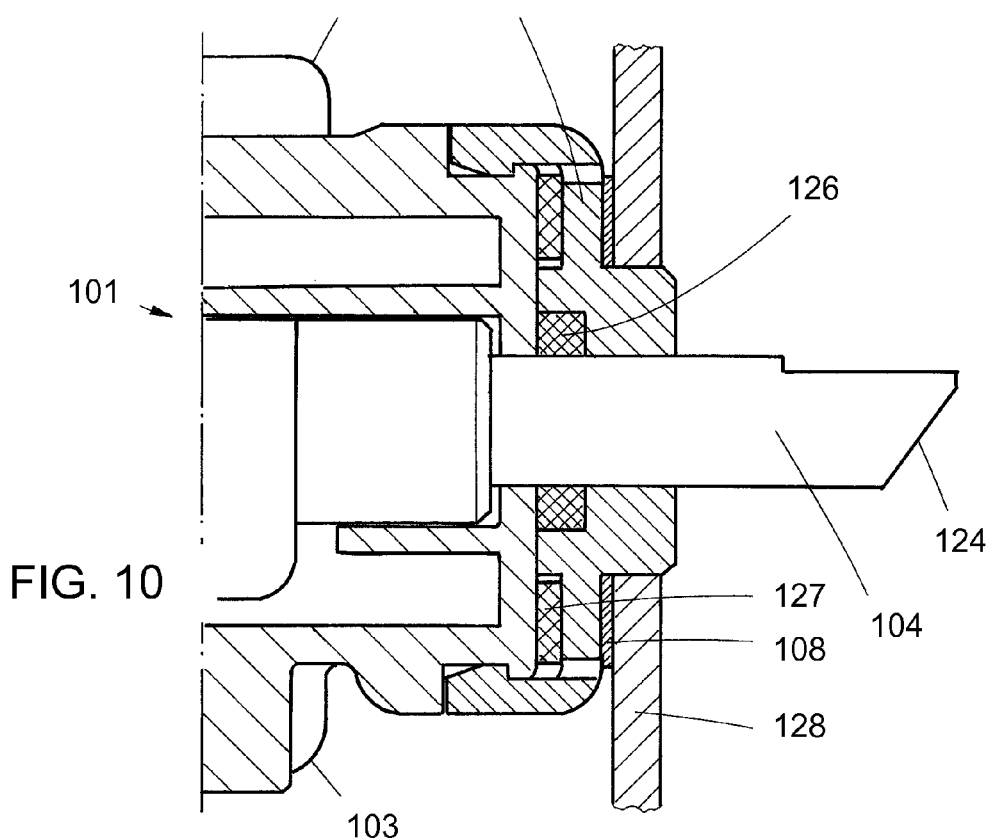
FIG. 10: shows a section through the region of the locking bar

FIG. 10 shows a section through the region of the locking bar 104 that serves for locking. According to it, one or two further sealing rings 126 and 127 can be present within the sealing sleeve 107. In particular, there are two rings, which preferably have a different hardness in order to be able to seal particularly reliably if selected suitably. The sealing ring 126 is adjacent—preferably in a dust-tight and moisture-tight manner—to the locking bar 104 and thus provides for a tight connection between the housing 103 and the locking bar 104 in this region. The other sealing ring 127 contributes to a tight connection between the sealing sleeve 107 and the housing 103, particularly when the sealing sleeve is pressed against a wall 128 of another component. Moreover, a dust-tight and moisture-tight connection is thus particularly reliably created between the wall 128 and the adjacent region of the locking bar 104.

Figures 11, 12:
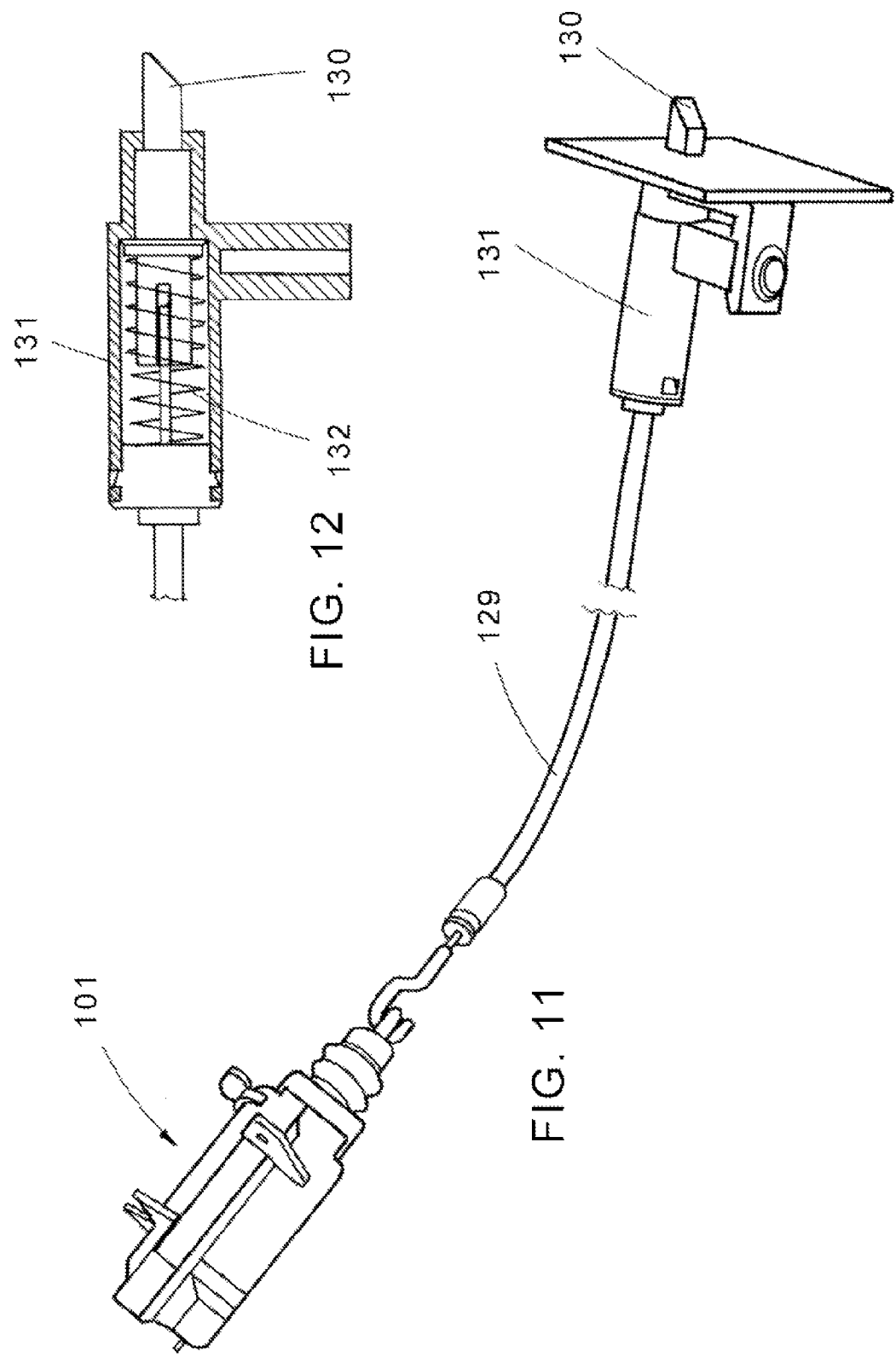
FIG. 11: shows a remote actuation by means of a Bowden cable
FIG. 12: shows a component with a latching bolt for remote actuation

FIG. 11 shows a use of the actuator with which a latching bolt 130 is remotely actuated through a Bowden cable. A hook-shaped end attached to the cable of the Bowden cable is, on the one hand, hooked into an eyelet of the locking bar of an actuator 101. On the other hand, the other end of the cable is hooked into a corresponding bracket of the latching bolt 130, as FIG. 12 shows.

FIG. 12 shows a section through a component 131 comprising the latching bolt 130. The latching bolt 130 is moved into the locking position and held in this position by means of a spring 132. By means of the Bowden cable 129, the latching bolt 130 can be moved from the locking position into the component 131 in order to then be able to release, for example, a lid or a connection between a charging socket and a charging plug.

Figure 13:
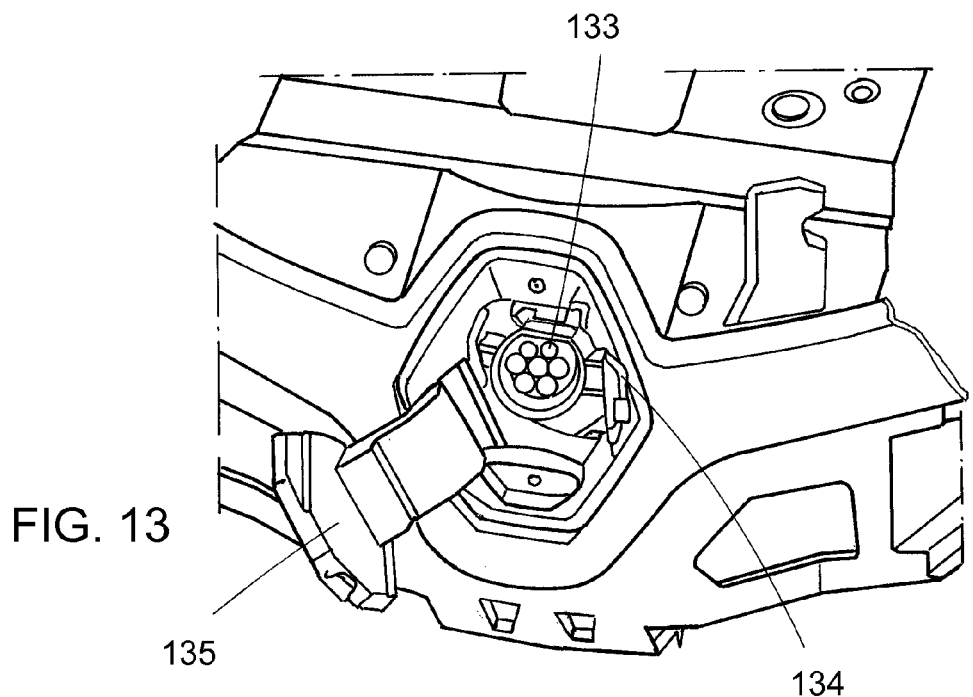
FIG. 13: shows an outside view of a region of the body with a charging socket of an electric vehicle

FIG. 13 shows a charging socket 133 of an electric vehicle from the outside, which can be driven by means of an electric motor. A battery, from which the electric motor of the electric vehicle draws its power, can be charged via the charging socket 133.

The charging socket can first be closed in a moisture-tight and dust-tight manner by means of a lid 134. Additionally, there is a lid 135 that is capable of closing that region of the body in which the charging socket 133 is located.

Figure 14:
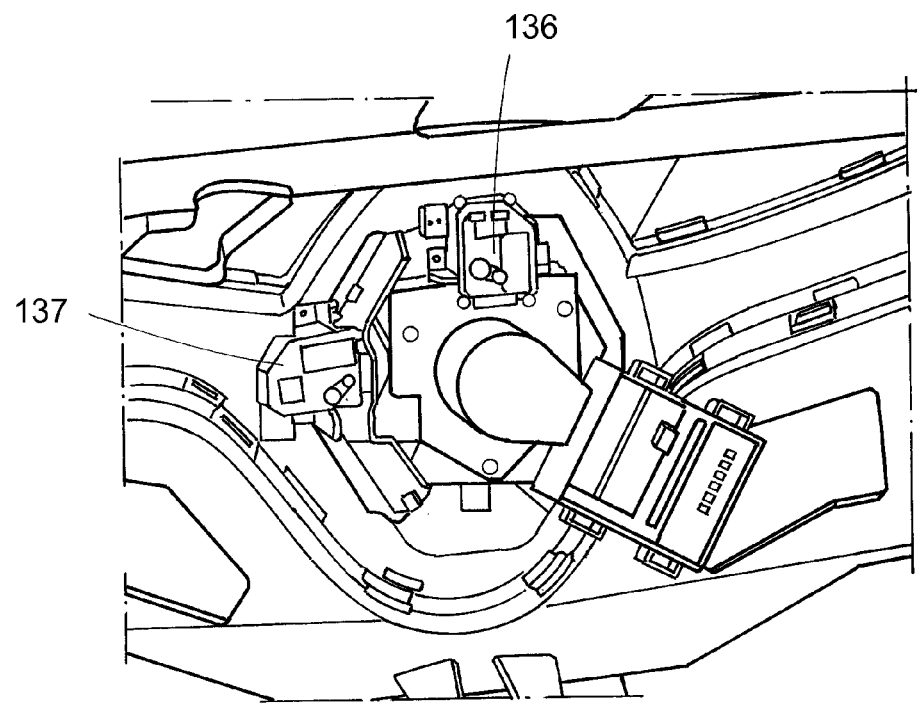
FIG. 14: shows an inside view of a region of the body with a charging socket of an electric vehicle

FIG. 14 shows the region from FIG. 13 from the inside. There are two actuators 136 and 137. The actuator 136 serves for locking a connection between the charging socket and the charging plug. The actuator 137 serves for locking a lid, for example the lid 135, in order to prevent unauthorized access to the charging socket 133.

Figure 15:
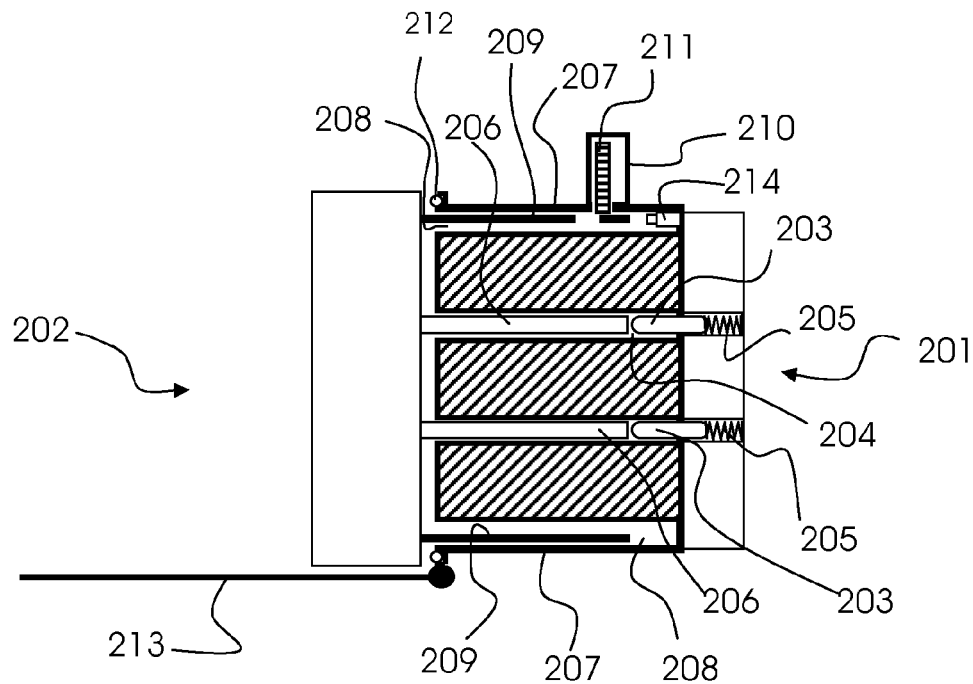
FIG. 15: shows the charging plug and charging socket

FIG. 15 shows a section through a charging socket 201 and a charging plug 202. The charging plug 202 has not yet completely been pushed into the charging socket 201. The charging socket 201 is provided with resiliently mounted electrical contacts 203 located in recesses 204. Two recesses are shown. An electrically conductive contact which can be pressed further towards the bottom against a biased spring 205 is located at the bottom of each hollow-cylindrical recess.

Because the charging plug 202 has not yet completely been pushed into the socket, its contacts 206 do not yet touch the contacts 203 of the charging socket. A lateral wall 207 of the charging socket extends around the recesses 204, so that a peripherally extending gap 208 remains. Into this cylindrically extending gap 208, a corresponding lateral, cylindrically peripherally extending wall 209 of the charging socket 202 is pushed in order to connect the charging plug 202 to the charging socket 201.

An actuating element 210 comprising a locking bar 211 is attached at one location to the lateral wall 207. The actuating element 210 comprises a motor, which is not shown, and by means of which the locking bar 211 is moved. A rotary movement of the motor is in that case converted into a translatory movement, for example by means of a spindle which is not shown. Moreover, the actuating element 210 can also comprise a sensor, i.e. a microswitch, for example, by means of which the position of the locking bar 211 can be detected. Thus, it is possible to establish and signal by means of such a sensor whether or not the locking bar 211 is located in its locking position.

A sealing sleeve, which is not shown, and which comes close to the locking bar 211, is located between the housing of the actuating element 210 and the adjacent wall 207 of the charging socket. Because of this sealing sleeve, no dust and no moisture is able to enter through these two walls from the outside to the locking bar 211 of the actuating element 210.

At the upper edge of the lateral peripherally extending wall 207, there is a peripherally extending furrow into which a sealing ring 212 consisting of elastic rubber is pressed. Further sealing rings can be provided which extend around the openings of the recesses 204. A folding lid 213 with which the opening of the charging socket 201 can be closed is attached to the socket 201.

One or more microswitches 214 are attached to the bottom of the gap 208. Such a microswitch may, however, also reach through the lateral wall 207 into the gap 208 near the bottom.

Figure 16:
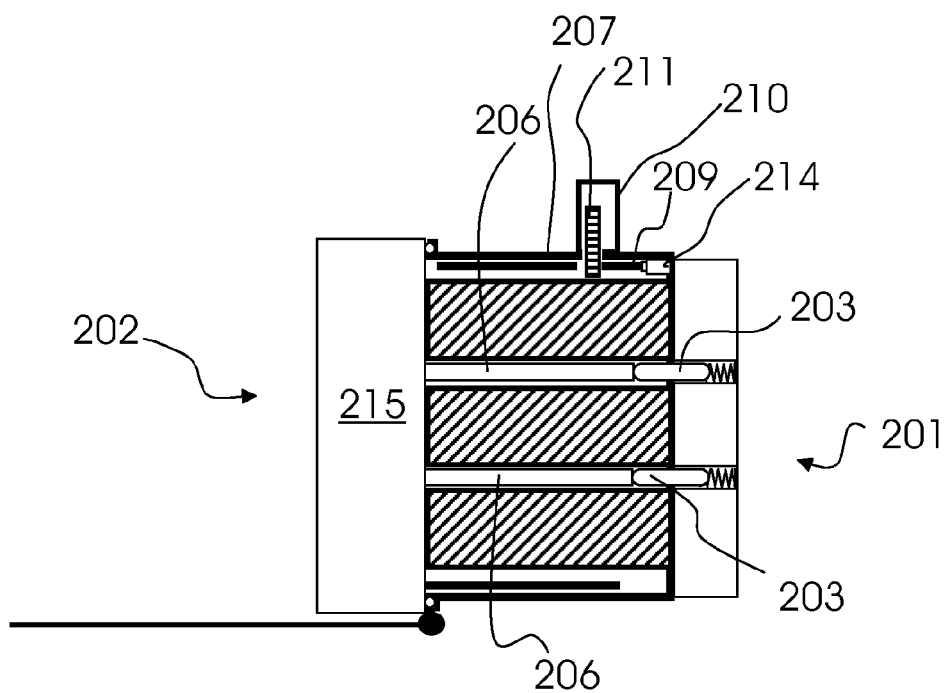
FIG. 16: shows the charging plug and charging socket in the fully connected state

FIG. 16 shows the situation in which the charging plug 202 has completely been pushed into the charging socket 201. The contacts 206 of the charging plug 202 now push the contacts 203 of the charging socket 201 towards the bottom against the spring force. The lateral wall 209 now actuates the microswitch 14. The actuated microswitch 214 causes the actuating element to have moved the locking bar 211 through an opening in the lateral wall 207 of the charging socket. If the microswitch 214 has been actuated by the charging plug, then an opening in the lateral outer wall 209 is aligned with the opening in the lateral wall 207. The locking bar is pushed also through this further opening.

Thus, the connection between the charging socket and the charging plug has been locked. A plate-shaped region 215 of the charging plug is in that case pushed against the sealing ring 212 of the charging socket, so that the charging socket is thereby closed in a dust-tight and moisture-tight manner. If there are further sealing rings (additionally or alternatively) extending around the openings of the above-mentioned recesses, then they can contribute, additionally or alternatively, to the recesses being closed in a dust-tight and moisture-tight manner.

Figure 17:
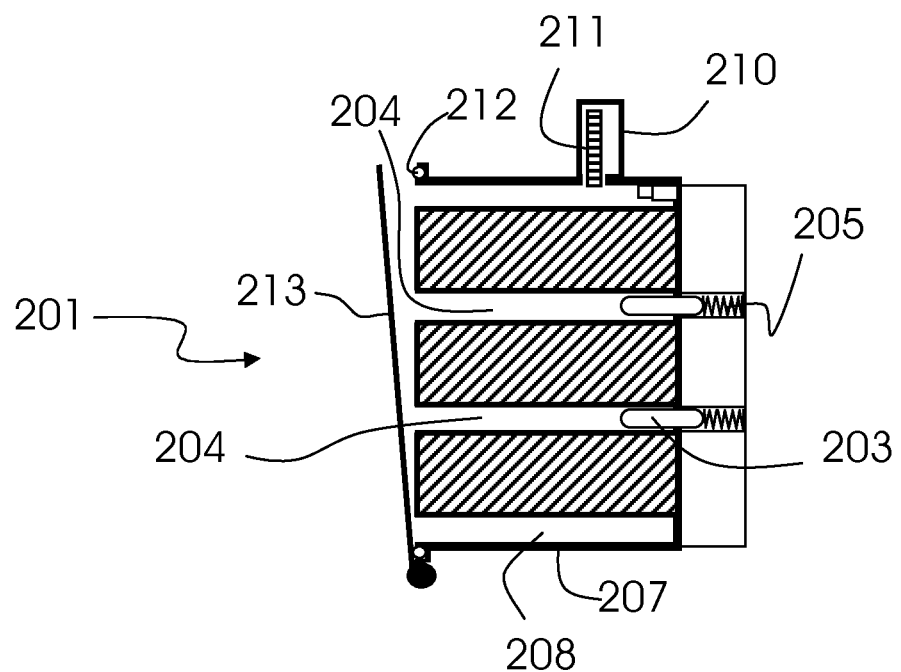
FIG. 17: shows the charging socket

FIG. 17 shows the charging socket 201 with a lid 213 which is capable of closing the inner region of the charging socket 201 in a dust-tight and moisture-tight manner. If the lid 213 closes the charging socket, the lid 213 also pushes against the provided sealing ring(s) 212. The lid 213 can also have a wall element or a tab which in the closed state of the lid extends into the gap 208 in the region of the locking bar 211, in order thus to be locked by the locking bar 211 by means of a corresponding opening or recess. This wall element or tab can also trigger the locking by actuating the sensor 214.

Additionally or alternatively, the electrical contacts 206 of the charging plug 202 can also be resiliently mounted. Expediently, the contacts 206 of the charging plug 202 are also located in additional, for example cylindrical, recesses, in order thus to protect against inadvertent touching in an improved manner.

Figure 18:
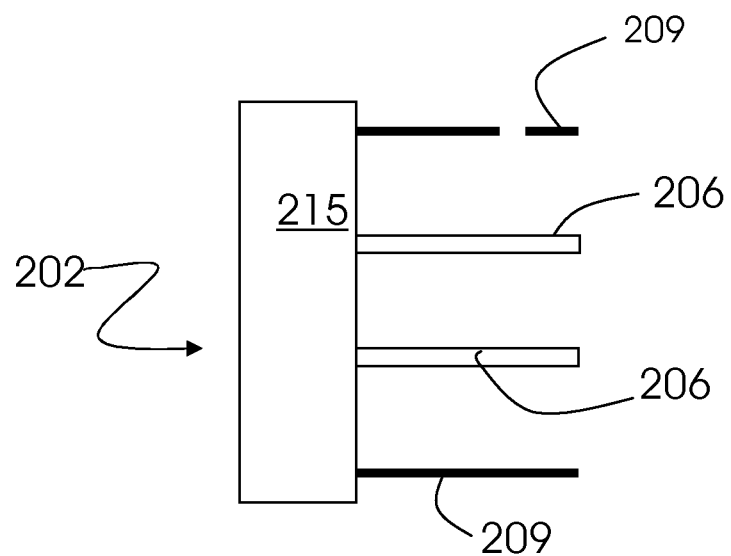
FIG. 18: shows the charging plug

FIG. 18 shows the charging plug 202 individually in order to show its configuration in an improved manner.

LIST OF REFERENCE NUMERALS

1 Actuator
2 Connection socket
3a, 3b Half shells
3c Membrane
4 Tabs
5 Locking bar
6 Eyelet
7 Sealing sleeve
8 Thread spindle
9 Electric motor
10 Carriage
11 Microswitch
12 Ramp
13 Bolt
14 Projection
15 Furrow
16 Sealing ring
17 Furrow
18 Bore
101 Actuator
102 Rotatable external lever
103 Housing
104 Locking bar
105 Eyelet
106 Hooking portion
107 Sealing sleeve
108 Sealing ring
109 Electrical connector
110 Tabs
111 Frame
112 Guide member
113 Housing half
114 Bolt
115 Arm
116 Microswitch
117 U-shaped wire or spring
117a Indentation/Bulge
118 Bolt
119 Internal lever
120 Axis
121 Sealing ring
122 Latching lug
123 Resilient arm
124 Inclined portion
125 Latching recesses
126 Sealing ring
127 Sealing ring
128 Wall of another component
129 Bowden cable
130 Latching bolt
131 Component
132 Spring
133 Charging socket
134 Lid with small base area
135 Lid with large base area
136 Actuator
137 Actuator
201: Charging socket
202: Charging plug
203: Electrical contacts
204: Recesses
205: Biased spring
206: Electrical contacts
207: Lateral wall
208: Peripherally extending gap
209: Cylindrically peripherally extending wall
210: Actuating element
211: Locking bar
212: Sealing ring
213: Folding lid
214: Microswitch
215: Plate-shaped region of the charging plug

The invention claimed is:

1. An actuator for a motor vehicle comprising:
a housing attached to a wall of the motor vehicle;
a locking bar that is electrically movable between an initial position and a locking position, wherein the locking bar includes a projecting bolt;
an electric drive unit for electrically moving the locking bar between the initial position and the locking position;
an internal lever rotatably mounted within the housing, wherein the internal lever captures the projecting bolt to move the locking bar towards the initial position;
a sealing sleeve resting against an exterior surface of the housing, wherein the sealing sleeve includes a projecting portion having an opening through which the locking bolt extends, wherein the projecting portion extends through an opening in the wall of the motor vehicle such that the locking bar extends through the opening of the projecting portion of the sealing sleeve and through the opening of the wall of the motor vehicle in the locking and initial positions; and
an external lever rotatably mounted outside of the housing, wherein the external lever is manually actuatable and configured to cause rotary movement of the internal lever upon manual actuation of the external lever, wherein the projecting bolt is configured to translate the rotary movement of the internal lever by the manual actuation of the external lever to unidirectional linear manual movement of the locking bar from the locking position to the initial position, the unidirectional linear manual movement of the locking bar being only initiated when the locking bar is in the locking position.

2. An actuator according to claim 1, further comprising a releasable latching mechanism for holding the locking bar in the initial position or in the locking position.

3. An actuator according to claim 1, further comprising a guide region for guiding the locking bar and a spring engageable between the locking bar and the guide region, wherein the spring includes an elastic constricted portion and the locking bar includes a second bolt protruding therefrom that is moveable through the constricted portion of the spring when the locking bar moves between the initial position and the locking position.

4. An actuator according to claim 1, wherein the housing is sealed in a water-tight and/or dust-tight manner.

5. An actuator according to claim 1, wherein the external lever includes a handle member or an eyelet located outside of the actuator.

6. An actuator according to claim 1, wherein an axis connected between the internal lever and the external lever includes at least one peripherally extending sealing ring.

7. An actuator according to claim 1, wherein the actuator includes a sensor for detecting the position of the locking bar.

8. An actuator according to claim 7, wherein the locking bar includes a frame and a projecting portion that extends outside of the frame, and wherein an end of the frame disposed opposite from the projecting portion includes a laterally projecting arm, wherein the laterally projecting arm actuates the sensor depending on the position of the locking bar.

9. An actuator according to claim 1 further comprising a spindle for converting a rotary movement of the electric drive unit into the electric movement of the locking bar between the initial position and the locking position, wherein the electric movement of the locking bar is linear movement.

10. An actuator according to claim 1, wherein the locking bar and the wall are sealed in a dust-tight and moisture-tight manner when the locking bar is in the locking position.

11. An actuator according to claim 1, wherein the locking bar is displaced between the initial position and the locking position by at least 10 mm.

* * * * *